3,083,552
METHOD FOR FORMING CASED GLASSWARE
Charles W. Carlson, 235 Melmore St., and Charles W. Carlson, Jr., 98 Gross St., both of Tiffin, Ohio
Filed Dec. 21, 1959, Ser. No. 860,818
3 Claims. (Cl. 65—48)

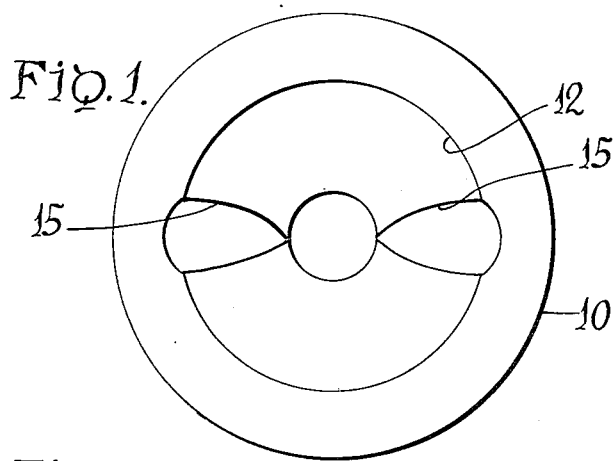
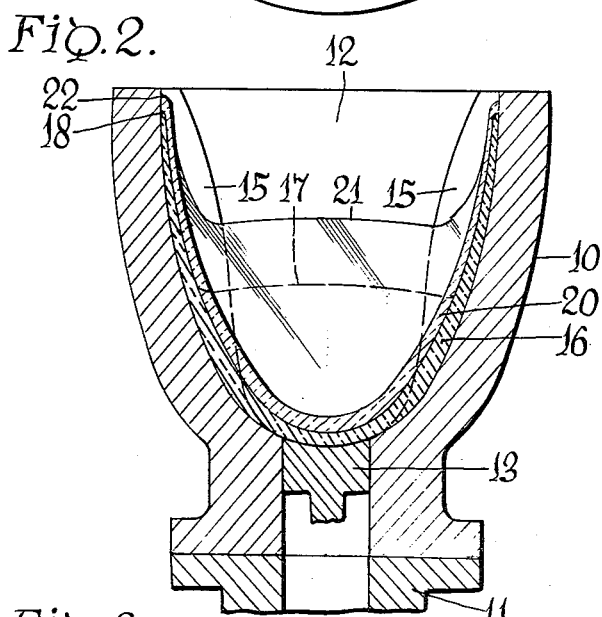
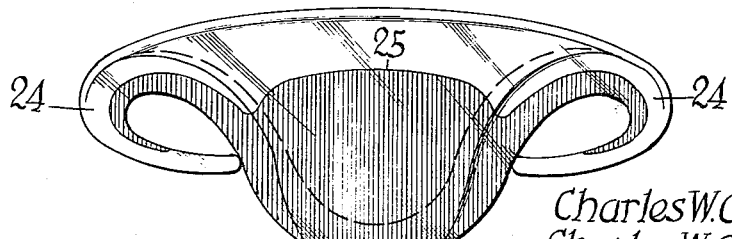
INVENTORS
*Charles W. Carlson &
Charles W. Carlson, Jr.,*
BY *Bean, Brooks, Buckley & Bean*
ATTORNEYS United States Patent Office 3,083,552
Patented Apr. 2, 1963

This invention relates to a novel method of producing composite glass articles and more particularly to a method of producing a decorative glass article comprising layers or laminations of two or more visually different kinds of glass.

The present invention is in the general field of high quality hand made glass articles as distinguished from lower priced types of glassware which is pressed to shape in a mold and is usually referred to as pressed ware. Speaking generally, the method of the present invention, in one form, produces a generally bowl-shaped glass article of one kind of glass, crystal glass for instance, with a partial or complete overlay of another kind of glass, colored glass for instance, with the two kinds of glass thoroughly fused to each other as an incident to the method of forming and fabricating the same and without the necessity of additional firing or other treatment.

Glassware having the foregoing peculiar characteristics of appearance is not broadly new and is known in the art of decorative glassware as cased glass or overlay. However, the cased glass of the prior art has been produced only by artisans of the highest degree of skill and artistry, and only by slow and painstaking methods. Furthermore, cased glass produced by old methods is limited in variety by the very complexity of the production techniques and is, in any event, so costly as to be practically prohibitive, excepting as articles of curiousity or rarity. Apart from the costliness in time and labor, very few glass technicians have the unusual skill and artistry required to produce cased glass by prior art double blowing and overlay methods with the result that practically no glass of this type reaches ordinary markets at the present time, even in the field of very fine hand crafted glassware.

The prior art method of making cased glass, sometimes called overlay, involves inflating a gather of colored glass and, after suitable preliminary preparation which comprises forming the blown colored glass into a cup-like shell, placing the same in a metal mold proportioned to receive the same, then gently blowing the further gather of glass of another characteristic, often clear glass, into the previously blown shell as though the latter were a mold.

The shell adheres to the clear glass superficially but it is necessary after withdrawing the thus laminated glass members to complete the fusion of the latter by a further firing operation. The usual, or at least the most common, method of finishing a cased article made in accordance with the foregoing prior art method, after the same had been annealed, was to cut through the outer layer of colored glass to reveal the inner clear glass body in various desired areas and in accordance with various designs.

In its broadest aspect, the present invention relates to a novel method of producing decorative glass articles comprising at least two layers of glass of different visual characteristic wherein the layers are intimately and completely fused to each other directly in the initial forming operations and wherein the primary stages of the forming operation may be carried out with such dispatch that there is no danger of cooling or other internal strains as between the two fused glass bodies.

The foregoing broad object is attached by depositing a gather of glass into a generally bowl-shaped mold and spinning the mold so that centrifugal force causes the molten glass to rise along the wall of the mold and distribute itself as a bowl-shaped layer of glass therein, then depositing a second gather of molten glass of a different visual character into the bowl-shaped layer thus formed while the same is still soft and hot and further spinning the mold to cause the second gather of glass to distribute itself in a similar bowl formation within the first formed bowl and, generally although not necessarily, upwardly beyond the same along the mold surface. The successive spinning of the two gathers of different glasses in the foregoing manner automatically results in an intimate and thorough fusion of their interfaces throughout their areas of contact.

In a most common instance of practicing the invention the first gather will comprise a colored glass and the second a clear glass such as crystal. Since the second gather of crystal glass is usually spun upwardly beyond the first layer of colored glass in this instance, the colored glass will appear as an overlay or case on the crystal glass.

Various modifications of the foregoing basic procedure may be effected within the scope of the present invention. For instance, the order of spinning the colored and clear glass may be reversed; the first gather may be spun to a greater height than the second; and more than two gathers may be spun so that multiple layer objects are produced.

An important refinement or development of the principles of the invention comprises employment of a mold wherein the interior surface is irregular or non-circular. For instance, one or any number of flutes may be formed to extend upwardly along the mold surface. Because of the greater mass of glass which is localized at the flute by the centrifugal spinning action, the glass will rise higher in the mold at the flute or flutes. In spinning a second gather a similar result will be obtained after the glass has been spun upwardly past the circular interior of the already spun first gather.

A multitude of design effects and variations can be achieved by skilled glass artisans by subsequent treatment and manipulation of the basic multiple layer glass forms thus produced in the spinning operation, as will appear to those skilled in the glass art from a consideration of the present specification. Merely by way of example, one special treatment of a basic form of multiple layer glass produced according to one form of the method of the present invention is set forth herein, although the design variations which may be practiced are virtually unlimited.

For the above reasons, the present specification merely exemplifies the general teachings and principles of the invention and the scope thereof is not limited to the specific form set forth nor otherwise than as defined in the appended claims.

In the drawing:

FIG. 1 is a top plan view of one form of spinning mold which may be employed in practicing the method of the present invention;

FIG. 2 is a central vertical cross-sectional view through the mold of FIG. 1; and FIG. 3 is an elevational view of a glass bowl illustrating one form of article which may be produced in pursuing the method of the present invention.

Referring to FIGS. 1 and 2, the numeral 10 designates a bowl-shaped cast iron mold which is adapted to be removably mounted on a vertical spindle 11 for rotation on a vertical axis. The mold 10 has a generally bowl-shaped cavity 12 and in the present instance the lower central portion of such cavity is formed by an ejection plug 13 which is movable upwardly to dislodge a molded glass article from the cavity after the spinning operation or operations.

In the form of mold illustrated in FIGS. 1 and 2, a pair of grooves or flutes 15 are formed in the mold cavity wall and the plural spinning method proceeds substantially as follows.

A gather of molten glass is placed in the mold where it will rest substantially centrally at the bottom of the cavity. The gather may be deposited in the mold while the latter is spinning or at rest. Upon spinning, centrifugal action acting upon the gather of glass causes the same to spread radially outwardly and, due to the confinement of the mold cavity, to spread upwardly along the wall of the same to assume a substantially bowl-shaped form.

In the present specific instance, due to the grooves or flutes 15 and their greater distances from the axis of rotation than the remainder of the cavity, greater quantities of glass will be deposited in the grooves or flutes. That is, the natural centrifugal action will tend to produce a bowl-shaped form wherein the interior surface is of uniform roundness or circularity.

Since greater amounts of glass will be directed to the portions of the mold containing the grooves 15, such greater amounts of glass will move higher in the mold than at other portions thereof. At the conclusion of this first spinning operation the gather of glass deposited as above may assume the shape indicated by the reference numeral 16. The top edge of this bowl-shaped piece 16 may be as indicated by the dash line 17 excepting at the grooves 15 where the glass will rise higher to a height indicated in the present instance in FIG. 2 by the reference numeral 18.

Following this spinning operation and while the temperature of the glass of the piece 16 is still quite high, preferably above a temperature of 550 to 600 degrees F., a further gather of glass of another character is deposited in the mold containing the piece 16 and a second spinning operation is performed which causes the second gather of glass to assume the shape indicated at 20 in FIG. 2 and, in this case, the general top edge of the piece 20 may be as indicated at 21 with the top edge thereof at the flutes or grooves 15 being as indicated at 22 in FIG. 2.

In the present illustrative instance the second gather of glass extends higher than the first at all points around the spun composite article. Molds having no grooves or flutes 15 at all or anywhere from one to ten or a dozen such flutes or grooves, may be employed to produce various basic composite pieces which may then be treated in a variety of ways to produce a wide variety of decorative glass articles.

For instance, the composite molded article 16, 20 of FIG. 2 may be ejected from the mold by upward movement of ejection plug 13 and may be attached at its bottom central exterior portion to a punty in the usual manner and, following the usual "warming in" to resoften the glass, may be swung to elongate the molded composite piece in an axial direction. This will cause the more massive portions 18, 22 of the piece to stretch out farther in axial direction. This operation may be used to produce a tall slender vase if the swinging is carried on to a sufficient extent.

As one instance of further fashioning following the spinning operations, the bowl shown in FIG. 3 is manufactured by hand forming, after the foregoing swinging of the piece on a punty to a moderate degree, by generally spreading the bowl form of the piece laterally and by forming the curved loops 24 from the high portions of the basic article as produced by spinning into the grooves 15 and subsequently swinging the composite piece to exaggerate the axial length of the upward extensions 18, 22. Note the upper contour of the colored glass overlay as indicated at 25 in FIG. 3.

It is impossible to describe the multitude of different articles which may be produced by hand-fashioning the basic composite molded piece shown in FIG. 2 but numerous possibilities for final hand fashioning will occur to skilled artisans in the hand glass field. Articles ranging from flat pieces of the ash tray type to tall slender vases may be produced. The same infinite variety of hand treatment may be applied to composite pieces spun in a plain bowl-shaped mold cavity without the grooves or flutes 15.

The relative proportions of spun composite pieces will vary depending on the particular temperatures of the glass gathers during the spinning operations, the speed of spinning, and the length of time that the spinning is carried on. Also, of course, the shape of the mold cavity itself. By spinning the second gather of glass in the first already spun gather while the latter is still at a temperature of upward of 500 degrees F., or thereabouts, it is found that the fusion between the surfaces of the two glass bodies is intimate and complete and requires no further firing as in the case of ordinary cased glass made by prior art techniques. The spinning itself may be carried on at various empirically determined speeds which vary considerably depending upon the size and shape of the mold cavity, the quantity, kind and temperature of the glass, the degree of attenuation which is desired, and other factors.

We claim:
1. The method of forming cased glass articles which comprises placing a gather of molten lass in a bowl-shaped mold and spinning the mold to spread the glass across the bottom and up the side wall of said mold, terminating said spinning while the glass still forms a bowl-shaped article having an imperforate bottom, placing a second gather of molten glass of a different characteristic in the bottom of said bowl-shaped glass article while the same is still hot and spinning the second gather to spread the same substantially across the interior surface of said article to fuse therewith and produce a fused multi-layer glass article.

2. The method of forming cased glass articles which comprises placing a gather of molten glass in a bowl-shaped mold and spinning the mold to spread the glass across the bottom and up the side wall of said mold, terminating said spinning while the glass still forms a bowl-shaped article having an imperforate bottom, placing a second gather of molten glass of a different visual characteristic in the bottom of said bowl-shaped glass article while the same is still hot and spinning the second gather to spread the same substantially across and beyond the interior surface of said article to fuse therewith and produce a fused multi-layer glass article with the glass of said different visual characteristic exposed at the upper portion of the exterior surface of said article.

3. The method of forming cased glass articles which comprises placing a gather of molten glass in a bowl-shaped mold cavity having an upwardly extending channel therein and spinning the mold to spread the glass across the bottom and up the side wall of said mold, said glass rising higher at said channel than at other portions owing to greater centrifugal force, terminating said spinning while the glass still forms a bowl-shaped article having an imperforate bottom, placing a second gather of molten glass of a different characteristic in the bottom of said bowl-shaped article while the same is still hot and spinning the second gather to spread the same substantially across the interior surface of said article to fuse therewith and produce a fused multi-layer glass article.

References Cited in the file of this patent
UNITED STATES PATENTS

| 2,744,034 | Dalton et al. | May 1, 1956 |
| 2,926,459 | Pinotti | Mar. 1, 1960 |

FOREIGN PATENTS

| 23,346 | Australia | Oct. 20, 1930 |
| | of 1929 | |